US012607340B1

(12) United States Patent
Chen et al.

(10) Patent No.: US 12,607,340 B1
(45) Date of Patent: Apr. 21, 2026

(54) LED PANEL LIGHT

(71) Applicant: Huizhou Latu Film Equipment Co.LTD, Huizhou (CN)

(72) Inventors: Jidi Chen, Huizhou (CN); Zhisheng Xu, Huizhou (CN)

(73) Assignee: Huizhou Latu Film Equipment Co.LTD, Huizhou (CN)

( * ) Notice: Subject to any disclaimer, the term of this patent is extended or adjusted under 35 U.S.C. 154(b) by 0 days.

(21) Appl. No.: 19/030,587

(22) Filed: Jan. 17, 2025

(30) Foreign Application Priority Data

Dec. 26, 2024 (CN) .......................... 202411934798.7

(51) Int. Cl.
*F21V 29/76* (2015.01)
*F21V 15/01* (2006.01)
(Continued)

(52) U.S. Cl.
CPC ............ *F21V 29/763* (2015.01); *F21V 15/01* (2013.01); *F21V 21/30* (2013.01); *F21V 23/006* (2013.01); *F21V 23/009* (2013.01); *F21V 29/503* (2015.01); *F21V 29/60* (2015.01); *F21V 29/67* (2015.01); *G03B 15/02* (2013.01); *F21Y 2115/10* (2016.08)

(58) Field of Classification Search
CPC ....... G03B 15/02; F21V 29/503; F21V 29/67; F21V 15/01
See application file for complete search history.

(56) References Cited

U.S. PATENT DOCUMENTS

2014/0126214 A1* 5/2014 Gebhard ................. F21V 29/74
362/294
2015/0198310 A1* 7/2015 Scarlata ................ F21V 29/507
362/249.01
(Continued)

FOREIGN PATENT DOCUMENTS

KR 102007716 B1 * 8/2019 ............. F21V 15/01

OTHER PUBLICATIONS

Machine translation of Kim, KR 102007716 B1, published Aug. 7, 2019 (Year: 2019).*

*Primary Examiner* — William N Harris
(74) *Attorney, Agent, or Firm* — Birchwood IP

(57) ABSTRACT

LED panel light includes housing, bracket, and illumination assembly. Housing comprises heat sink base with multiple fins, outer shell, inner shell, and center shell. Inner shell mounts on heat sink base, outer shell encompasses inner shell, and they jointly define mounting cavity. Center shell extends through inner shell connecting to heat sink base, wherein inner wall of center shell and heat sink base jointly define light-transmitting chamber. Illumination assembly comprises control board within mounting cavity; LED board, light diffusion sheet, and light-transmitting tube within light-transmitting chamber. LED board thermally couples to heat sink base, and light diffusion sheet attaches to light-transmitting tube's inner wall. Thermal coupling between heat sink base and LED board enables rapid heat dissipation for extended operation periods. Inner shell specifically accommodates control board, isolating it from other components, enhancing sealing performance and moisture resistance, thereby reducing malfunction probability when LED panel light operates in humid environments.

10 Claims, 7 Drawing Sheets

(51) Int. Cl.

| | | |
|---|---|---|
| *F21V 21/30* | (2006.01) | |
| *F21V 23/00* | (2015.01) | |
| *F21V 29/503* | (2015.01) | |
| *F21V 29/60* | (2015.01) | |
| *F21V 29/67* | (2015.01) | |
| *F21Y 115/10* | (2016.01) | |
| *G03B 15/02* | (2021.01) | |

(56) References Cited

U.S. PATENT DOCUMENTS

2016/0320026 A1\*  11/2016  Duckworth ............. F21V 15/01
2020/0056764 A1\*   2/2020  Baxter ................... F21V 17/10

\* cited by examiner

LED PANEL LIGHT

CROSS-REFERENCE TO RELATED APPLICATIONS

This application claims priority to Chinese Patent Application No. 202411934798.7, filed on Dec. 26, 2024, which is hereby incorporated by reference in its entirety.

TECHNICAL FIELD

The present invention relates to the field of illumination, and more particularly to LED panel light.

BACKGROUND

Fill lighting at photography sites commonly employs panel lights, where photographers need to constantly adjust the lighting angle according to shooting angles, thus requiring panel lights to be easily portable. Particularly during outdoor shooting activities, when the scenery changes with time and weather conditions, and shooting tasks are intensive, multiple panel lights often need to be used alternately to meet the requirements of long-duration fill lighting.

Furthermore, when used in humid environments (such as rainy days or seaside locations), panel lights face the risk of moisture exposure, where water vapor infiltration into the panel light interior can easily lead to malfunctions.

Therefore, how to improve the heat dissipation capability of panel lights to enable long-duration operation and enhance their adaptability to humid environments is a problem that needs to be solved.

SUMMARY

The objective of the present invention is to overcome deficiencies in the prior art by providing an LED panel light that improves the heat dissipation capability to enable long-duration operation and enhance their adaptability to humid environments The objective of the present invention is achieved through the following technical solution:

The LED panel light, comprising: a housing, a bracket, and an illumination assembly;

wherein the housing comprises a heat sink base, an outer shell, an inner shell, and a center shell, wherein the heat sink base is provided with multiple heat sink fins, the inner shell is mounted on the heat sink base, the outer shell encompasses the inner shell, the inner shell and the heat sink base jointly define a mounting cavity, the center shell extends through the inner shell and connects to the heat sink base, and an inner wall of the center shell and the heat sink base jointly define a light-transmitting chamber;

wherein the bracket is connected to the heat sink base;

wherein the illumination assembly comprises a control board located within the mounting cavity and an LED board, a light diffusion sheet, and a light-transmitting tube located within the light-transmitting chamber, wherein the LED board is attached to the heat sink base and electrically coupled to the control board, and LED chips on the LED board face toward the light-transmitting tube, and the light diffusion sheet is attached to an inner wall of the light-transmitting tube.

In one embodiment, a gap is provided between the LED board and the light-transmitting tube to allow communication between the light-transmitting tube and the light-transmitting chamber.

In one embodiment, the housing further comprises a protective control board cover mounted over the control board, wherein the protective control board cover is adhesively bonded to the heat sink base with glue, and a cable hole is formed on the side of the protective control board cover proximate to the LED board.

In one embodiment, a relief groove is formed on the side of the center shell proximate to the control board, wherein the relief groove is configured to communicate between the light-transmitting chamber and the mounting cavity; wherein a blowing assembly is disposed within the relief groove, the blowing assembly comprises a blocking block and two impellers, wherein the blocking block is formed with a blowing chamber and an air passage extending through the blowing chamber, and the impellers are rotatably disposed within the blowing chamber; wherein each impeller is provided with multiple toothed blades, the toothed blades of the two impellers mesh with each other, the air passage faces toward the meshing position of the toothed blades, the toothed blades are attached to an inner wall of the blowing chamber, and the toothed blades are configured to guide airflow from the light-transmitting chamber toward the mounting cavity and direct it toward the protective control board cover.

In one embodiment, portions of the toothed blades that contact the inner wall of the blowing chamber are arc-shaped.

In one embodiment, the blocking block is adhesively bonded to the relief groove with glue.

In one embodiment, the housing further comprises a cooling fan directed toward the heat sink fins.

In one embodiment, corner guards are provided on the edges of the housing.

In one embodiment, the bracket comprises an L-shaped frame, a fixing cap, a friction plate, a U-shaped clamp, a pull rod, a handle, and a locking block, wherein the fixing cap is mounted on the heat sink base, the friction plate is mounted on the fixing cap, and the friction plate has a diameter greater than that of the fixing cap; wherein the locking block is mounted on the L-shaped frame, the locking block is provided with a bolt configured to connect with the fixing cap, the U-shaped clamp comprises two clamping plates respectively positioned on opposite sides of the friction plate, the pull rod extends through the two clamping plates and is threadedly connected to the handle, and the handle is rotatable to cause the clamping plates to clamp the friction plate.

In one embodiment, the illumination assembly further comprises a panel mounted on the heat sink base on a side away from the inner shell, wherein the panel is electrically coupled to the control board, and the panel comprises a display screen, operation keys, a knob, and a DMX connector.

The above-described LED panel light has the following beneficial effects:

1. The heat sink base and the LED board are attached to each other, enabling rapid heat dissipation from the LED board, thereby allowing the LED panel light to operate for extended periods;

2. The addition of the inner shell specifically for accommodating the control board isolates the control board from other components, enhances sealing performance, and increases resistance to external moisture penetration, thus reducing the probability of malfunction when the LED panel light is used in humid environments.

BRIEF DESCRIPTION OF DRAWINGS

To more clearly illustrate the technical solutions of the embodiments of the present invention, a brief introduction to the drawings used in the embodiments will be given below. It should be understood that the following drawings show only certain embodiments of the present invention and therefore should not be considered as limiting the scope, and those skilled in the art can obtain other related drawings without creative labor based on these drawings.

DESCRIPTION OF EMBODIMENTS

To facilitate understanding of the present invention, a more comprehensive description of the present invention will be given below with reference to the related drawings. The drawings show preferred embodiments of the present invention. However, the present invention may be implemented in many different forms and is not limited to the embodiments described herein. Rather, these embodiments are provided to enable a more thorough and comprehensive understanding of the disclosure of the present invention.

It should be noted that when an element is described as being "fixed to" another element, it may be directly on the other element or intervening elements may also be present. When an element is described as being "fixed to" another element, it may be directly on the other element or intervening elements may also be present. The terms "vertical," "horizontal," "left," "right," and similar expressions used herein are for illustrative purposes only and do not indicate the only possible embodiments.

Unless otherwise defined, all technical and scientific terms used herein have the same meanings as commonly understood by those skilled in the technical field to which the present invention belongs. The terms used in the specification of the present invention are used only for the purpose of describing specific embodiments and are not intended to limit the invention. The term "and/or" used herein includes any and all combinations of one or more of the associated listed items.

Figure 1:
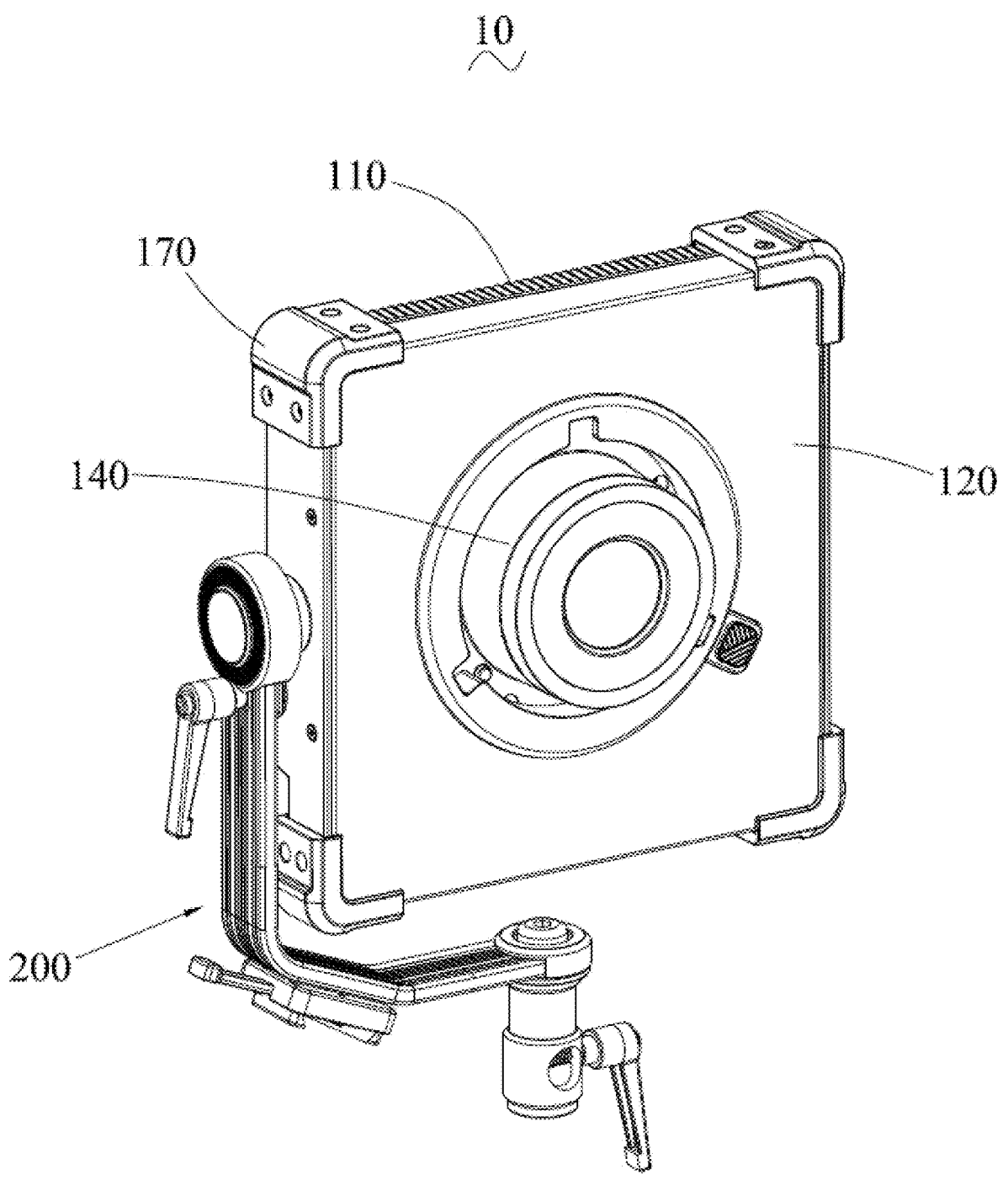
FIG. 1 is a front structural view of the LED panel light.

Please refer to FIG. 1; the present invention provides an LED panel light 10, comprising a housing, a bracket 200, and an illumination assembly.

Figure 2:
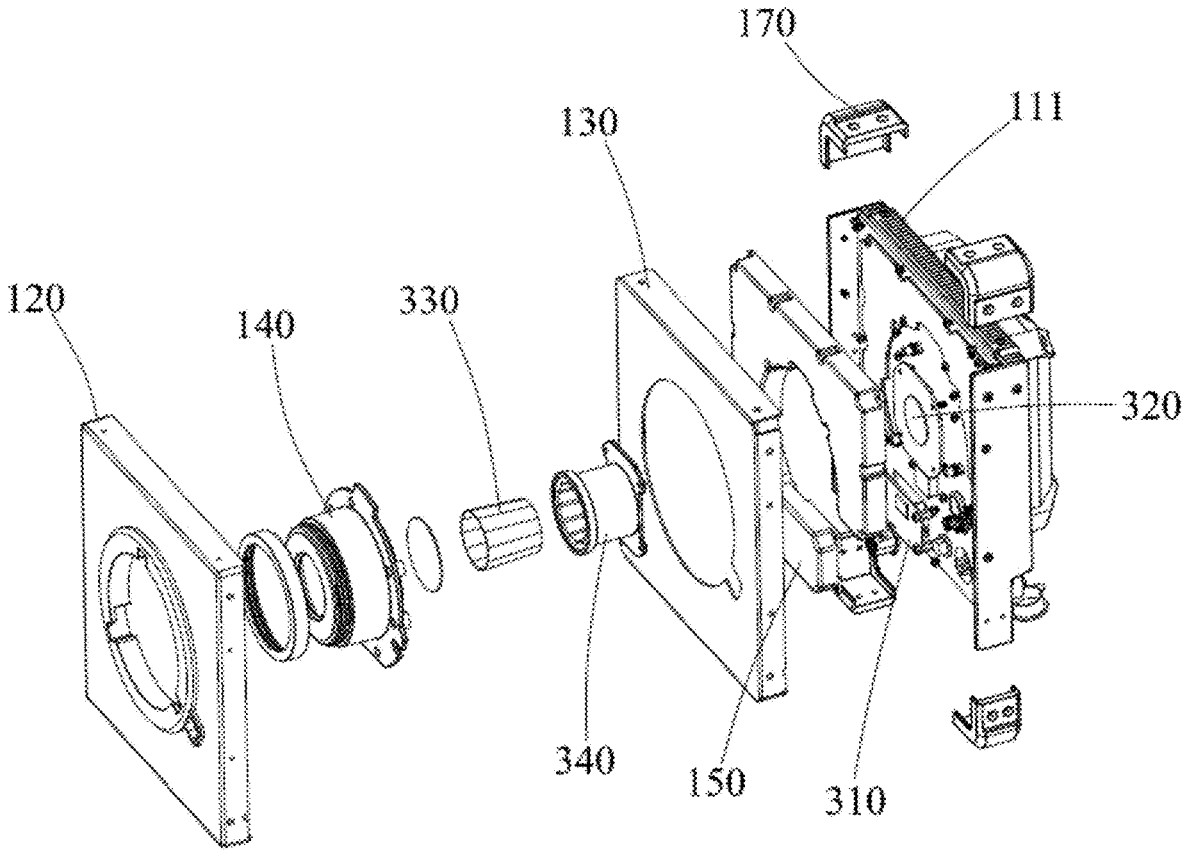
FIG. 2 is an exploded view of the housing and the illumination assembly.
Figure 3:
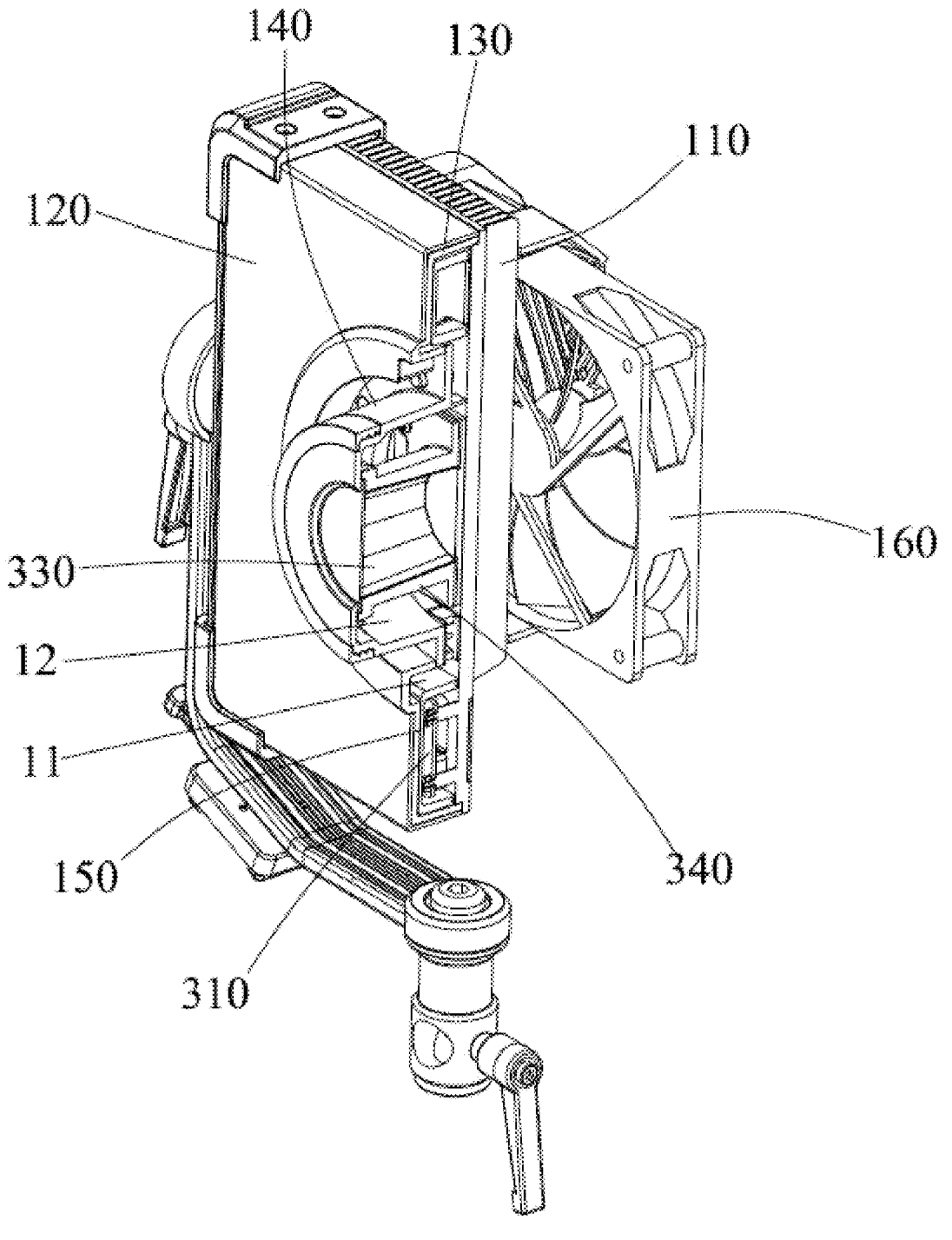
FIG. 3 is a partial sectional view of the LED panel light.
Figure 6:
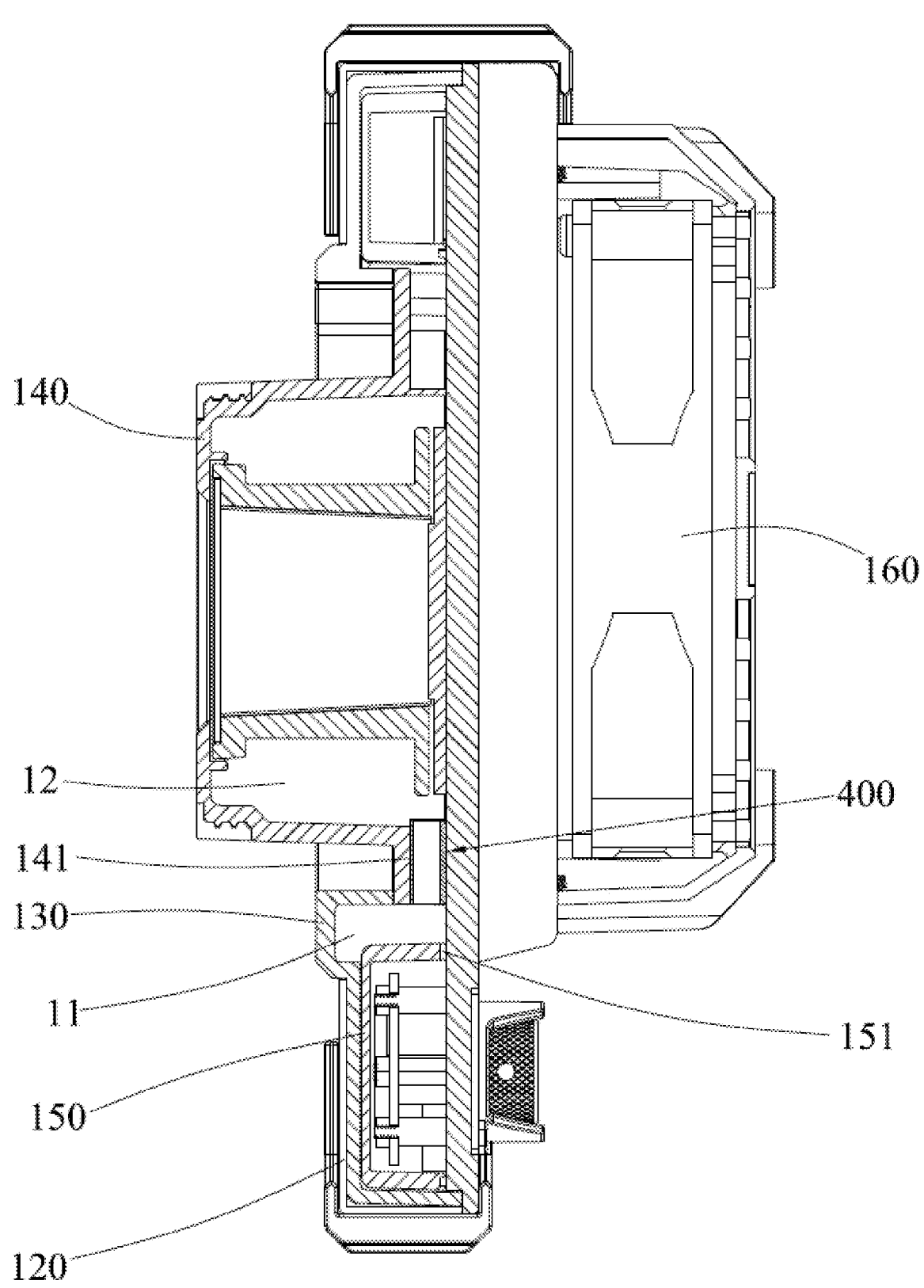
FIG. 6 is a schematic view showing the distribution of the mounting cavity and the light-transmitting chamber.

Please refer to FIGS. 3 and 6, the housing comprises a heat sink base 110, an outer shell 120, an inner shell 130, and a center shell 140, wherein the heat sink base 110 is provided with multiple heat sink fins 111, the inner shell 130 is mounted on the heat sink base 110, the outer shell 120 encompasses the inner shell 130, the inner shell 130 and the heat sink base 110 jointly define a mounting cavity 11, the center shell 140 extends through the inner shell 130 and connects to the heat sink base 110, and an inner wall of the center shell 140 and the heat sink base 110 jointly define a light-transmitting chamber 12;

The bracket 200 is connected to the heat sink base 110;

Please refer to FIGS. 2 and 3, the illumination assembly comprises a control board 310 located within the mounting cavity 11 and an LED board 320, a light diffusion sheet 330, and a light-transmitting tube 340 located within the light-transmitting chamber 12, wherein the LED board 320 is attached to the heat sink base 110, the LED board 320 is electrically coupled to the control board 310, and LED chips on the LED board 320 face toward the light-transmitting tube 340, and the light diffusion sheet 330 is attached to an inner wall of the light-transmitting tube 340.

Figure 4:
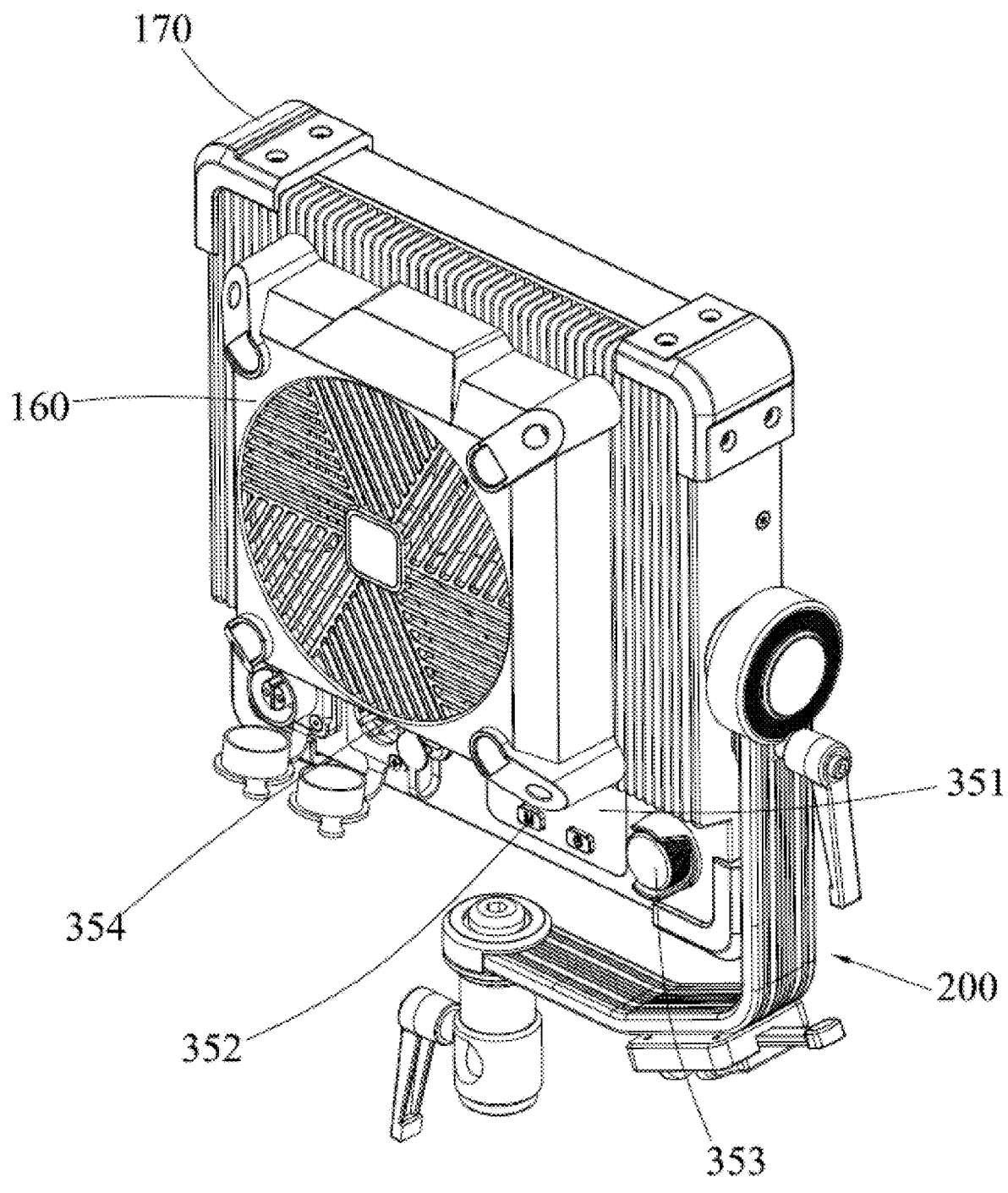
FIG. 4 is a rear structural view of the LED panel light.

Please refer to FIGS. 3 and 4, preferably, the housing further comprises a cooling fan 160, wherein the cooling fan 160 faces toward the heat sink fins 111, and since the LED board 320 is attached to the heat sink base 110, heat generated during operation of the LED board 320 is directly transferred to the heat sink fins 111, and the cooling fan 160 blowing air toward the heat sink fins 111 can further accelerate heat dissipation.

Please refer to FIG. 4, in one embodiment, the housing is provided with corner guards 170 at its edges, and the illumination assembly further comprises a panel mounted on the heat sink base 110 on a side away from the inner shell 130, wherein the panel is electrically coupled to the control board 310, and the panel comprises a display screen 351, operation keys 352, a knob 353, and a DMX connector 354. Users can operate the panel light through the operation keys 352 and knob 353 on the panel, and monitor the operating status of the panel light through the display screen 351.

The above-described LED panel light 10 has the following beneficial effects:

1. The heat sink base 110 and the LED board 320 are attached to each other, enabling rapid heat dissipation from the LED board, thereby allowing the LED panel light 10 to operate for extended periods;

2. The addition of the inner shell 130 specifically for accommodating the control board 310 isolates the control board 310 from other components, enhances sealing performance, and increases resistance to external moisture penetration, thus reducing the probability of malfunction when the LED panel light 10 is used in humid environments.

Please refer to FIGS. 2 and 3, to enhance the water and dust resistance of the LED panel light 10, in one embodiment, a gap is provided between the LED board 320 and the light-transmitting tube 340 to establish communication between the light-transmitting tube 340 and the light-transmitting chamber 12. The housing is further provided with a protective control board cover 150 that covers the control board 310, wherein the protective control board cover 150 is adhesively bonded to the heat sink base 110, and a cable hole 151 is formed on the side of the protective control board cover 150 proximate to the LED board 320. The provision of the protective control board cover 150 enhances the sealing performance at the location of the control board 310, further increasing the difficulty for moisture and dust to contact the control board 310.

In the above embodiment, by enhancing the sealing performance at the location of the control board 310, external moisture is prevented from entering the LED panel light 10 and adhering to the control board 310, thereby reducing the probability of malfunction when using the LED panel light 10 in humid environments. However, when the LED panel light 10 is placed in a humid environment for extended periods to provide illumination, environmental moisture can still penetrate through gaps (such as the cable hole 151) to reach the control board 310, and the low temperature in humid environments will reduce the electrical performance of electronic components on the control board 310, preventing the LED panel light 10 from operating for extended periods in humid environments.

Figure 7:
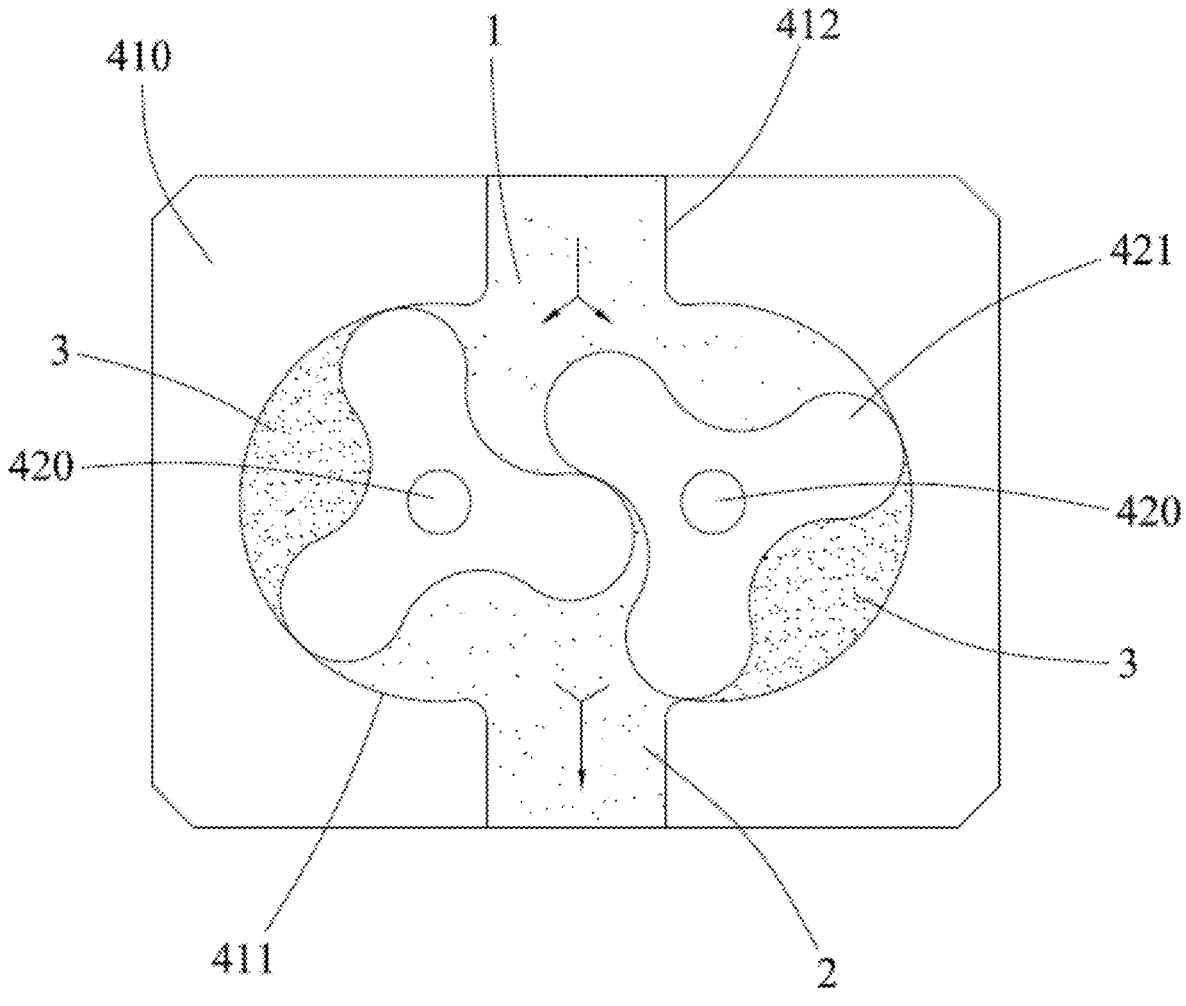
FIG. 7 is a structural view of the blowing assembly.

Please refer to FIGS. 6 and 7, to address the above issue, a relief groove 141 is formed on the side of the center shell 140 proximate to the control board 310, wherein the relief groove 141 is configured to establish communication between the light-transmitting chamber 12 and the mounting cavity 11;

A blowing assembly 400 is disposed within the relief groove 141, wherein the blowing assembly 400 comprises a blocking block 410 and two impellers 420, the blocking block 410 is formed with a blowing chamber 411 and an air passage 412 extending through the blowing chamber 411, and the impellers 420 are rotatably disposed within the blowing chamber 411; preferably, the blocking block 410 is adhesively bonded to the relief groove 141.

The impellers 420 are provided with multiple toothed blades 421, wherein the toothed blades 421 of the two impellers 420 mesh with each other, the air passage 412 faces toward the meshing position of the toothed blades 421, the toothed blades 421 are attached to the inner wall of the blowing chamber 411, and the toothed blades 421 are configured to guide airflow from the light-transmitting chamber 12 toward the mounting cavity 11 and direct it toward the protective control board cover 150.

Preferably, the portions of the toothed blades 421 that contact the inner wall of the blowing chamber 411 are arcuate in shape. This reduces friction between the toothed blades 421 and the inner wall of the blowing chamber 411.

The operating principle of the aforementioned blowing assembly 400 that enables the LED panel light 10 to operate for extended periods in humid environments is as follows:

The blowing assembly 400 is activated only when the LED panel light 10 is placed in a humid environment;

One of the two impellers 420 is drivingly connected to an internal motor, i.e., one serves as a drive wheel while the other impeller 420 serves as a driven wheel, and since the toothed blades 421 of the two impellers 420 mesh with each other, when one impeller 420 rotates, it can drive the other impeller 420 to rotate synchronously through the toothed blades 421;

Wherein the air passage 412 extends through the blowing chamber 411 and faces toward the meshing position of the toothed blades 421, and when the impellers 420 rotate, they can drive air to flow from the light-transmitting chamber 12 toward the mounting cavity 11. Since the LED board 320 generates heat during extended operation, causing the temperature in the light-transmitting chamber 12 to be higher than that in the mounting cavity 11, when air is driven into the mounting cavity 11, the heated air can be utilized to dry moisture on the surface of the control board 310, keeping it dry, and raise the temperature of the control board 310, preventing it from operating in a low-temperature environment.

The specific process of air flow guided by the rotating impellers 420 is shown in FIG. 7, wherein the left impeller 420 rotates counterclockwise, the right impeller 420 rotates clockwise, the upper portion represents the location of the light-transmitting chamber 12, the lower portion represents the location of the mounting cavity 11, and the air passage 412 is divided into an upper air chamber 1 and a lower air chamber 2 by the meshing toothed blades 421. When the impellers 420 rotate, they draw air to move in the direction of the toothed blades 421, and the air moves from the upper air chamber 1 into small air chambers 3 formed between the toothed blades 421 and the inner wall of the blowing chamber 411. Due to the reduced space, the air entering the small air chambers 3 is compressed, increasing air pressure; as the toothed blades 421 continue to rotate, they roll the compressed air in the small air chambers 3 toward the lower air chamber 2, where the space increases, allowing the pressurized air to be released and pass through the air passage 412 into the mounting cavity 11, with air flow direction as indicated by the arrows. Thus, with continuous rotation of the toothed blades 421, air from the light-transmitting chamber 12 can be continuously conveyed toward the light-transmitting chamber 12.

It should be emphasized that the blowing assembly 400 is activated only when the LED panel light 10 operates for extended periods in humid environments, utilizing the heat generated when the LED board 320 is illuminated, in conjunction with the impellers 420 guiding airflow toward the control board 310, to achieve the purpose of drying moisture on the surface of the control board 310 and raising its temperature. Users can manually shut off the blowing assembly 400 to stop hot air delivery to the mounting cavity 11, and when the impellers 420 stop rotating, since the toothed blades 421 are in a meshing state, they can form a barrier in the air passage 412, preventing hot air from the light-transmitting chamber 12 from unnecessarily rushing into the mounting cavity 11.

Figure 5:
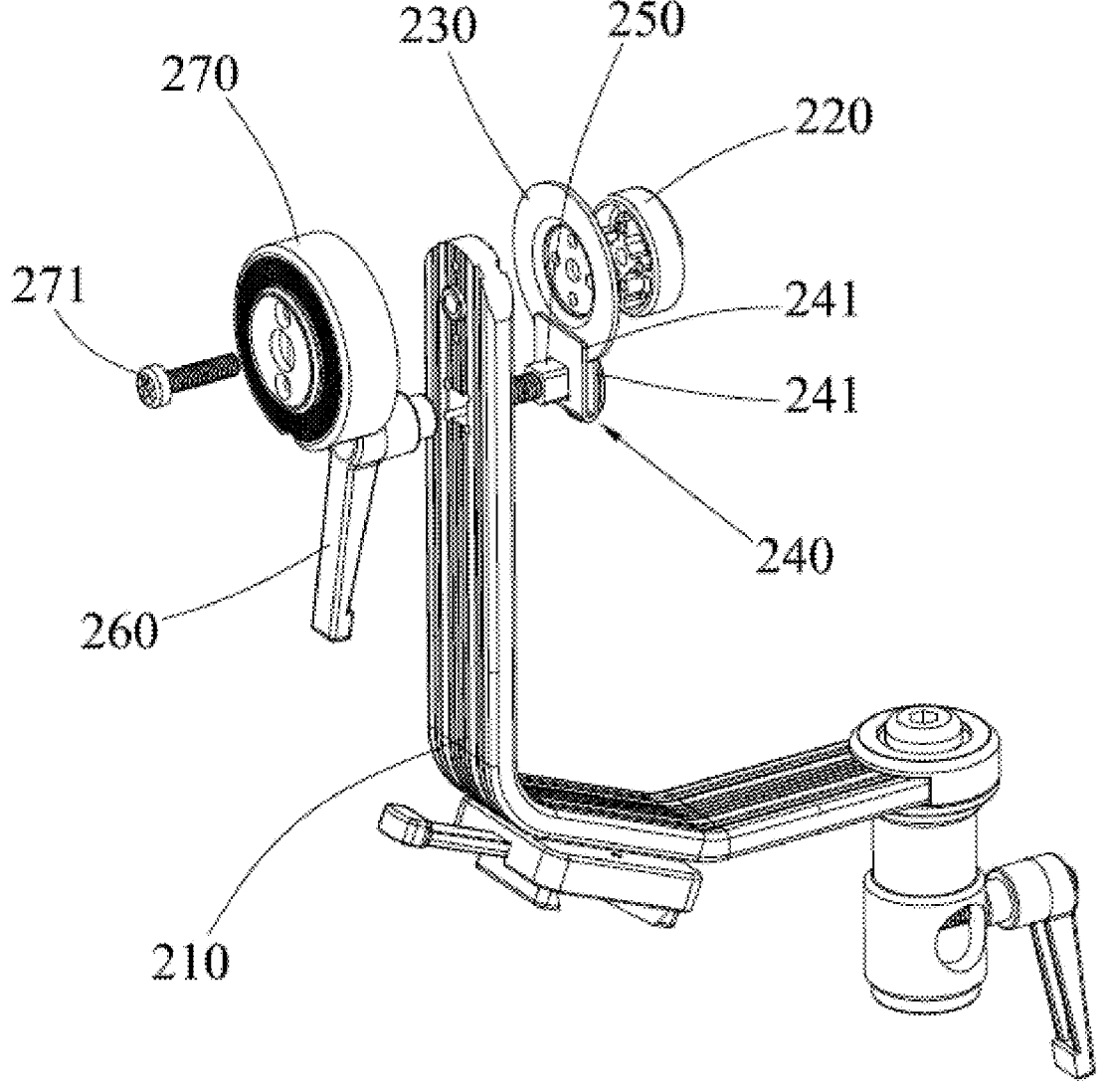
FIG. 5 is an exploded view of the bracket.

Please refer to FIG. 5, in one embodiment, the bracket 200 comprises an L-shaped frame 210, a fixing cap 220, a friction plate 230, a U-shaped clamp 240, a pull rod 250, a handle 260, and a locking block 270, wherein the fixing cap 220 is mounted on the heat sink base 110, the friction plate 230 is mounted on the fixing cap 220, and the diameter of the friction plate 230 is larger than that of the fixing cap 220; the locking block 270 is mounted on the L-shaped frame 210, the locking block 270 is provided with a bolt 271 configured to connect with the fixing cap 220, the U-shaped clamp 240 is provided with two clamping plates 241 positioned on opposite sides of the friction plate 230, the pull rod 250 extends through the two clamping plates 241 and is threadedly connected to the handle 260, and rotating the handle 260 causes the clamping plates 241 to clamp the friction plate 230.

Rotating the handle 260 drives the pull rod 250 to move toward the side where the handle 260 is located, causing the pull rod 250 to press against the clamping plates 241, bringing the clamping plates 241 closer together to firmly clamp the friction plate 230, thereby securing the L-shaped frame 210 to the heat sink base 110; rotating the handle 260 in the opposite direction moves the pull rod 250 away from the pull rod 250, reducing the pressure exerted by the pull rod 250 on the clamping plates 241, causing the clamping plates 241 to move apart and separate from the friction plate 230, allowing the heat sink base 110 to rotate relative to the L-shaped frame 210 about the centerline of the bolt 271. Therefore, when adjusting the illumination angle of the LED panel light 10, first rotate the handle 260 in the opposite direction to separate the clamping plates 241 from the friction plate 230, adjust the angle as desired, and then rotate the handle 260 to cause the clamping plates 241 to firmly clamp the friction plate 230. The locking force is provided by the friction between the friction plate 230 and the clamping plates 241, and both the clamping plates 241 and the friction plate 230 are detachable components that can be individually replaced when the connection becomes loose, thereby extending the service life of the bracket 200.

The above-described embodiments merely express several implementation modes of the present invention, and while their descriptions are relatively specific and detailed, they should not be understood as limitations on the scope of the patent invention. It should be pointed out that for those skilled in the art, various modifications and improvements can be made without departing from the concept of the present invention, and these modifications and improvements all fall within the protection scope of the present invention. Therefore, the protection scope of the present invention patent shall be defined by the appended claims.

What is claimed is:

1. An LED panel light, comprising: a housing, a bracket, and an illumination assembly;

wherein the housing comprises a heat sink base, an outer shell, an inner shell, and a center shell, wherein the heat sink base includes multiple heat sink fins, the inner shell is mounted on the heat sink base, the outer shell encompasses the inner shell, the inner shell and the heat sink base jointly define a mounting cavity, the center shell extends through the inner shell and connects to the heat sink base, and an inner wall of the center shell and the heat sink base jointly define a light-transmitting chamber;

wherein the bracket is connected to the heat sink base;

wherein the illumination assembly comprises a control board located within the mounting cavity and an LED board, a light diffusion sheet, and a light-transmitting tube located within the light-transmitting chamber, wherein the LED board is attached to the heat sink base and electrically coupled to the control board, and LED chips on the LED board face toward the light-transmitting tube, and the light diffusion sheet is attached to an inner wall of the light-transmitting tube.

2. The LED panel light according to claim 1, wherein a gap is provided between the LED board and the light-transmitting tube to allow communication between the light-transmitting tube and the light-transmitting chamber.

3. The LED panel light according to claim 2, wherein the housing further comprises a protective control board cover mounted over the control board, wherein the protective control board cover is adhesively bonded to the heat sink base with glue, and a cable hole is formed on a side of the protective control board cover proximate to the LED board.

4. The LED panel light according to claim 3, wherein a relief groove is formed on a side of the center shell proximate to the control board, wherein the relief groove is configured to communicate between the light-transmitting chamber and the mounting cavity;

wherein a blowing assembly is disposed within the relief groove, the blowing assembly comprises a blocking block and two impellers, wherein the blocking block is formed with a blowing chamber and an air passage extending through the blowing chamber, and the impellers are rotatably disposed within the blowing chamber;

wherein each impeller is provided with multiple toothed blades, the toothed blades of the two impellers mesh with each other, the air passage faces toward a meshing position of the toothed blades, the toothed blades are attached to an inner wall of the blowing chamber, and the toothed blades are configured to guide airflow from the light-transmitting chamber toward the mounting cavity and direct it toward the protective control board cover.

5. The LED panel light according to claim 4, wherein portions of the toothed blades that contact the inner wall of the blowing chamber are arc-shaped.

6. The LED panel light according to claim 4, wherein the blocking block is adhesively bonded to the relief groove with glue.

7. The LED panel light according to claim 1, wherein the housing further comprises a cooling fan directed toward the heat sink fins.

8. The LED panel light according to claim 1, wherein corner guards are provided on edges of the housing.

9. The LED panel light according to claim 1, wherein the bracket comprises an L-shaped frame, a fixing cap, a friction plate, a U-shaped clamp, a pull rod, a handle, and a locking block, wherein the fixing cap is mounted on the heat sink base, the friction plate is mounted on the fixing cap, and the friction plate has a diameter greater than that of the fixing cap;

wherein the locking block is mounted on the L-shaped frame, the locking block is provided with a bolt configured to connect with the fixing cap, the U-shaped clamp comprises two clamping plates respectively positioned on opposite sides of the friction plate, the pull rod extends through the two clamping plates and is threadedly connected to the handle, and the handle is rotatable to cause the clamping plates to clamp the friction plate.

10. The LED panel light according to claim 1, wherein the illumination assembly further comprises a panel mounted on the heat sink base on a side away from the inner shell, wherein the panel is electrically coupled to the control board, and the panel comprises a display screen, operation keys, a knob, and a DMX connector.

* * * * *